US006990066B1

(12) United States Patent
Buckland et al.

(10) Patent No.: US 6,990,066 B1
(45) Date of Patent: Jan. 24, 2006

(54) METHOD FOR USING A PRE-CONFIGURED ATM SWITCH AND TRAFFIC DISCARD TO FACILITATE UPSR SELECTION

(75) Inventors: Kenneth M. Buckland, Santa Rosa, CA (US); Jan C. Hobbel, Cotati, CA (US); Robert D. Howson, Jr., Santa Rosa, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/413,738

(22) Filed: Oct. 6, 1999

(51) Int. Cl.
*G01R 31/08* (2006.01)
*H04J 1/16* (2006.01)
*H04L 12/56* (2006.01)

(52) U.S. Cl. .................... 370/222; 370/228; 370/395.1
(58) Field of Classification Search ............... 370/221, 370/222, 223, 225, 228, 216, 230, 235, 236, 370/242, 244, 248, 249, 252, 395.1
See application file for complete search history.

(56) References Cited

U.S. PATENT DOCUMENTS

| | | | | |
|---|---|---|---|---|
| 4,736,465 A | * | 4/1988 | Bobey et al. ............... | 359/166 |
| 5,355,362 A | * | 10/1994 | Gorshe et al. .............. | 370/222 |
| 5,532,862 A | * | 7/1996 | Tada et al. .................. | 359/161 |
| 5,535,035 A | * | 7/1996 | DeFoster et al. ........... | 359/161 |
| 6,317,414 B1 | * | 11/2001 | Naohiro ...................... | 370/222 |
| 6,424,629 B1 | * | 7/2002 | Rubino et al. ........... | 370/241.1 |
| 6,442,134 B1 | * | 8/2002 | Mitchell ..................... | 370/223 |

OTHER PUBLICATIONS

"Transport Systems Generic Requirements (TSGR): Common Requirements," (A Module of FR-440, TSGR), Generic Requirements GR-499-CORE, Issue 2, Dec., 1998, *Bellcore*.
"Synchronous Optical Network (SONET) Transport Systems: Common Generic Criteria," A Module of TSGR, FR-440, Generic Requirements GR-253-CORE, Issue 2, Dec., 1995, *Bellcore*.
"Digital Interface Between the SLC®96 Digital Loop Carrier System And A Local Digital Switch," Technical Reference TR-TSY-000008, Issue 2, Aug., 1987, Revision 1, Sep., 1993, *Bellcore*.
"Integrated Digital Loop Carrier System Generic Requirements, Objectives, and Interface," (A module of TSGR, FR-440), Generic Requirements GR-303-CORE, Issue 2, *Bellcore*, Dec., 1998.

* cited by examiner

*Primary Examiner*—John Pezzlo
*Assistant Examiner*—Saba Tsegaye
(74) *Attorney, Agent, or Firm*—Baker Botts L.L.P.

(57) ABSTRACT

An ATM switch is configured to route ATM traffic from two receive circuits to a destination. One copy of this traffic is discarded in one of the receive circuits so that only a single copy is passed to the ATM switch. Receive circuits contemplate both virtual path (VP) level and card or circuit level metrics for qualification of signals.

32 Claims, 1 Drawing Sheet

METHOD FOR USING A PRE-CONFIGURED ATM SWITCH AND TRAFFIC DISCARD TO FACILITATE UPSR SELECTION

CROSS-REFERENCE TO RELATED APPLICATIONS

This application is filed concurrently with a commonly-owned application entitled METHOD FOR USING A PRE-CONFIGURED TDM SWITCH AND TRAFFIC DISCARD TO FACILITATE UPSR SELECTION.

TECHNICAL FIELD OF THE INVENTION

This invention relates to technology in a digital network and more particularly to techniques for protection of SONET UPSR.

BACKGROUND OF THE INVENTION

The synchronous optical network (SONET) standards for optical transmission include a number of mechanisms and recommendations for protecting transmitted traffic. These include making use of "rings" that contain all of the transmission termination points. Such rings provide two paths between each transmission point on the ring, thus providing a level of redundancy. There are two basic ways to exploit SONET rings to protect traffic: a uni-directional path switched ring (UPSR) and a bi-directional line switched ring (BLSR).

A UPSR operates by having two copies of the same traffic go in opposite directions from one side of a SONET ring to the other. At the exit point from the ring, the traffic from the two directions is compared, and the better version is selected for output. This approach can be utilized for asynchronous transfer mode (ATM) traffic using virtual path (VP) comparison. Specifically, the overhead associated with each ATM virtual path that provides performance indications is inspected to determine which path exhibits better performance by whatever performance criteria is chosen. ATM virtual paths include ATM cell streams that share the same 8-bit or 12-bit virtual path identifier (VPI) value in their cell headers.

Traditional approaches to UPSR for ATM involve switch reconfiguration. Specifically, an ATM switch is provided at the ring node where the VP is being extracted from the ring. This ATM switch is configured to switch the ATM traffic from one of the two VP copies through to a destination. The other VP copy is ignored by the ATM switch—it is not switched through to an outgoing transmission but is instead discarded. When the VP performance measures indicate that the VP copy being discarded has become the superior or preferred version of the two VP copies, the ATM switch is reconfigured to switch through this VP copy and to ignore the original VP copy. Such reconfigurations can be carried out indefinitely.

This type of ATM switch reconfiguration approach severely taxes the processing resources, such as a microprocessor (or other computing entity) that is controlling the switch. Reconfiguration is often a computationally involved task. The SONET standards require that switch reconfiguration occur within 50 ms of the failure of a transmission link that is carrying the active VP copy. This standard may not always be met under certain conditions.

SUMMARY OF THE INVENTION

According to the invention, SONET UPSR protection is effected by configuring an ATM switch to route ATM traffic from two receive circuits to the same destination. Based on UPSR traffic qualification, one copy of this traffic is discarded in one of the receive circuits so that only a single copy is passed to the ATM switch. Based on received performance measurements, the circuit performing the discard operation can change. The same or similar mechanism can be used to protect against equipment failure and effect removal of one of the receive circuits.

In one embodiment, an apparatus includes two or more receive circuits that receive ATM traffic from a traffic source as a number of copies via a number of paths. The receive circuits qualify signals on the paths to designate a particular receive circuit as active such that each other receive circuit discards its respective traffic. An ATM switch, configured to provide a route to a destination for each one of the paths, routes traffic from the active receive circuit to the destination.

Cells constituting the discarded VP copy will never reach an ATM switch, so the fact that the ATM switch is configured to route the cells through will be moot and precludes the corruption that would result if both VP copies were routed through to the same destination. This overall approach, including configuration of the ATM switch such that it routes both VP copies through to the destination, allows for very fast switch-overs between VP copies. These switch-overs are achieved using decentralized processing in the receive circuits, with controlling messages sent between those circuits. Therefore, the processing drain for any microprocessor controlling the ATM switch due to switch-overs may be reduced or eliminated. Other technical advantages are readily apparent to one skilled in the art from the following description, figures, and claims.

BRIEF DESCRIPTION OF THE DRAWINGS

For a more complete understanding of the present invention, and for further features and advantages, reference is now made to the following description taken in conjunction with the accompanying drawings, where like reference numerals represent like parts, in which.

DETAILED DESCRIPTION OF THE INVENTION

Figure 1:
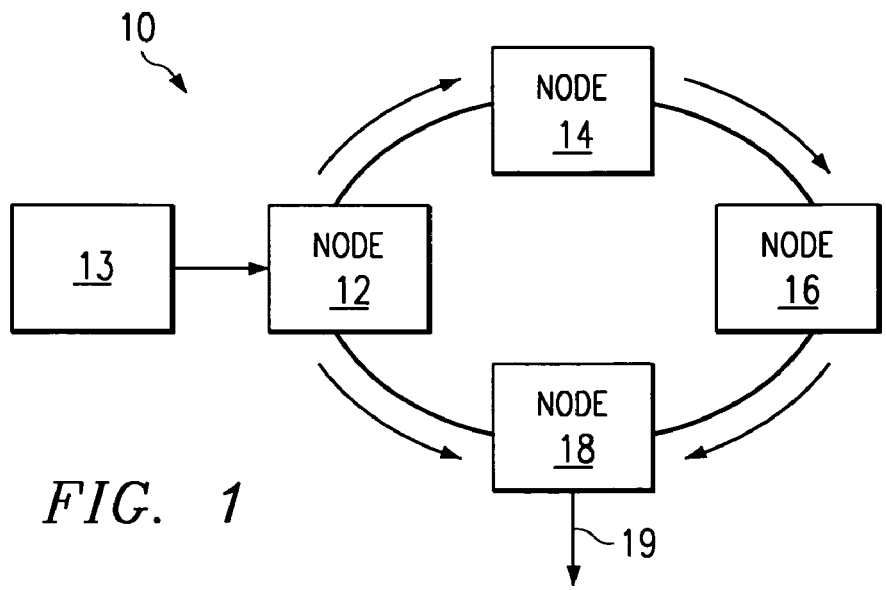
FIG. 1 is a block diagram of an ATM communication network according to the invention.

FIG. 1 is a block diagram of an ATM communication network 10 according to the invention. The nodes 12, 14, 16 and 18 may each include ATM switches as described below. Signal source 13 routes its traffic into node 12 which directs duplicate signals to node 18 via two paths, one through node 14 and node 16 and the other to node 18. Node 18 receives both signals, selects the best or preferred signal, and routes the selected signal to a destination 19.

Figure 2:
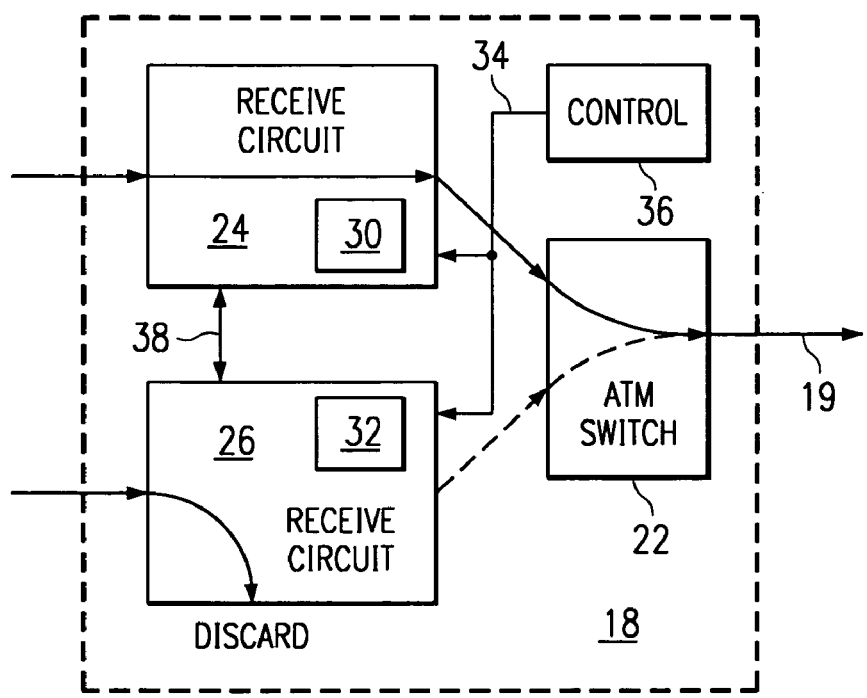
FIG. 2 is a block diagram of components in a node of the network illustrating the function of an ATM switch according to the invention.

Referring to FIG. 2, at node 18, an ATM switch 22 sets up a switch path so that both VP copies would be routed through to destination 19 if both VP copies were present. The receive circuits 24, 26 can both route the VP copies into the switch. However, one of receive circuits 24, 26 discards its VP copy based on a comparison of metrics exchanged between receive circuits 24, 26. The ATM switch 22 thus only routes one of the paths to destination 19. The other path simply acts as a null source.

For the purposes of selecting between two copies, VPs are qualified using the following criteria:
1. Alarm indication signal (AIS), loss of continuity (LOC), or terminating circuit card missing; and
2. High bit error rate (BER).

To perform the VP qualification, each receive circuit 24, 26 includes a decision module 30, 32 having memory and processing capabilities to perform the VP qualification. Decision modules 30, 32 each communicate information using bus 34 supported by control module 36. In a particular embodiment, bus 34 is functionally a cross-connect DS-0 implemented using a time-slot interchanger in control module 36. Decision modules 30, 32 may also communicate information for VP qualification using link 38 between receive circuits 24, 26 to detect equipment failure and/or removal. In one embodiment, link 38 supports a periodic keep-alive signal between receive circuits 24, 26, whereas bus 34 supports communication of qualification criteria between circuits 24, 26, such as AIS, LOC, and BER.

In a particular embodiment, communications between receive circuits 24, 26 occur in a master/slave environment. For purposes of this discussion assume receive circuit 24 is the master circuit, while receive circuit 26 is the slave circuit. In this embodiment, receive circuit 26 reports the qualification status of each VP upon which it receives traffic. Receive circuit 24 also determines the qualification status of each VP upon which it receives traffic, and also receives reports from receive circuit 26. Receive circuit 24 then selects, based on the qualification criteria, the active receive circuit 24, 26 to pass the VP traffic to ATM switch 22. The designation of master and slave may not change, but the active and stand-by status of receive circuits 24, 26 for passing particular VP traffic may change.

In operation, each receive circuit 24, 26 determines the VPI for each received ATM cell and performs a look-up in a table maintained by decision modules 30, 32. For each VPI, the table includes a pass-through bit or other indicator specifying whether the particular VPI represents pass-through VP traffic not intended for destination 19. For example, pass-through traffic may include cells passed through node 18 from node 16 to node 12 or cells passed through node 18 from node 12 to node 16. If the pass-through bit indicates that the cell is pass-through traffic, then no further VP qualification processing is performed. In a particular embodiment, control module 36 populates tables maintained by decision modules 30, 32 with pass-through bits for each provisioned VP. If the pass-through bit for the determined VPI indicates that the cell is to be routed to destination 19, then a qualification bit or other indicator specifies which receive circuit 24, 26 is currently active (passing traffic to ATM switch 22) and which receive circuit 24, 26 is stand-by (discarding traffic).

In the particular embodiment illustrated in FIG. 2, receive circuit 24 receives an ATM cell from node 16 having a particular VPI, and decision module 30 performs a table look-up using the VPI to determine that this cell is not pass-through (e.g., pass-through bit is set to zero), and that receive circuit 24 is active (e.g., qualification bit is set to one). As a result, receive circuit 24 passes the cell to ATM switch 22 for further processing and routing to destination 19. Receive circuit 26 receives the same cell from node 12, performs a table look-up at decision module 32 using the same VPI, and determines that this is not a pass-through cell, but that receive circuit 26 is stand-by for this particular VPI. As a result, receive circuit 26 does not pass the cell to ATM switch 22.

For a variety of reasons, receive circuit 24 as the master may determine that it should no longer be active. This determination may be made based on the receipt at receive circuits 24, 26 of management cells passed through or injected in the communication path from signal source 13 to node 18. For example, node 14 may detect an LOC condition between node 12 and node 14 due to, for example, an optical fiber cut. In this situation, node 14 inserts an AIS management cell for transmission to node 18 through node 16. Receive circuit 24 receives the management cell and determines that receive circuit 26 should be active. Receive circuit 24, still acting as master, sets the qualification bit in the table maintained by decision module 30 to indicate that receive circuit 24 is stand-by, and sends a message using bus 34 or link 38 to command receive circuit 26 to operate as active. Receive circuit 26 sets the qualification bit in the table maintained by decision module 32 to indicate that receive circuit 26 is active, and begins passing cells to ATM switch 22.

A similar operation can take place if receive circuit 24 receives management or overhead cells containing BER, LOC, or other qualification criteria for the particular VPI. These overhead or management cells may be sent as periodic polling messages that, if absent, may indicate a failure. Moreover, receive circuit 26 may perform a switch-over to active upon the detection of a loss of keep-alive signal from receive circuit 24 over link 38 as a result of equipment failure and/or removal. Therefore, receive circuits 24, 26 contemplate both VP level and card or circuit level metrics for qualification of signals. In any of these various embodiments, receive circuits 24, 26 communicate over bus 34 and/or link 38 to allow decision modules 30, 32 to determine the active/stand-by status of receive circuits 24, 26.

This overall approach, including configuration of ATM switch 22 to route both VP copies through to the destination, allows very fast switch-overs between VP copies. These rapid switch-overs are achievable through decentralized processing in receive circuits 24, 26 under prompting of control messages exchanged between receive circuits 24, 26. This reduces or eliminates the processing resources of ATM switch 22 needed to perform switch-over.

This UPSR approach can be generalized to select between two copies of any ATM traffic stream coming from any two directions, regardless of whether or not the two traffic streams actually pass over SONET rings or other network configurations. This approach can be further generalized to select between traffic from a number of sources (more than two), including from redundant switches within the same unit.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:
1. In an ATM network having a plurality of paths to a common destination, a method comprising:
   receiving ATM traffic from a traffic source as a plurality of copies of traffic routed along a plurality of paths, each one of the paths having a receive circuit;
   configuring an ATM switch to provide a route to a common destination for each one of the paths;

determining a qualified copy of the traffic based on information exchanged between two or more receive circuits; and discarding all copies of the traffic except for the qualified copy such that only the qualified copy is passed to the ATM switch for routing to the common destination.

2. The method of claim 1, wherein determining comprises receiving management cells on a path indicating an alarm indication signal (AIS) or loss of continuity (LOC).

3. The method of claim 1, wherein determining comprises detecting a loss of a keep-alive signal at one of the respective receive circuits.

4. The method of claim 1, wherein determining is based upon the following criteria:
   alarm indication signal (AIS),
   loss of continuity (LOC), or
   missing terminating circuit card; thereafter
   high bit error rate (BER).

5. The method of claim 1, wherein discarding comprises responding to qualifying information regarding the quality of virtual path (VP) copies to determine which VP copy is to be switched through and which is to be discarded at the respective receive circuit.

6. The method of claim 1, wherein determining comprises communicating information related to qualifying between the respective receive circuits.

7. The method of claim 1, wherein the paths comprise a first path in a first direction around a SONET UPSR and a second path in a second direction around the SONET UPSR.

8. The method of claim 1, wherein the ATM switch is configured to route ATM traffic for a given virtual path (VP) from each respective receive circuit to the common destination.

9. An apparatus in a network having a plurality of paths to a destination, comprising:
   a plurality of receive circuits operable to receive ATM traffic from a traffic source as a plurality of copies via a plurality of paths, the receive circuits operable to qualify signals on the paths based on information exchanged between two or more receive circuits to designate a particular receive circuit as active such that each other receive circuit discards its respective traffic; and
   the ATM switch configured to provide a route to a destination for each one of the paths, the ATM switch operable to route traffic from the active receive circuit to the destination.

10. The apparatus of claim 9, wherein each receive circuit is operable to receive management traffic on a path indicating a degradation or loss in signal.

11. The apparatus of claim 9, wherein each receive circuit is operable to detect a loss of a keep-alive signal of another receive circuit.

12. The apparatus of claim 9, wherein the receive circuits communicate information related to traffic qualification.

13. The apparatus of claim 9, wherein the ATM switch is configured to route ATM traffic for a given virtual path (VP) from each receive circuit to the destination.

14. The apparatus of claim 9, wherein the receive circuits qualify signals based upon the following criteria:
   alarm indication signal (AIS),
   loss of continuity (LOC), or
   missing terminating circuit card; thereafter
   high bit error rate (BER).

15. The apparatus of claim 9, wherein the paths comprise a first path in a first direction around a SONET UPSR and a second path in a second direction around the SONET UPSR.

16. A program embodied in computer-readable media and operable to perform the following steps:
   receiving, at a receive circuit, ATM traffic from a traffic source as one of a plurality of copies of traffic routed along a plurality of paths;
   determining, at the receive circuit, whether the received copy is a qualified copy of the traffic based on information received from another receive circuit;
   discarding the received copy if the received copy is not the qualified copy; and
   communicating the received copy from the receive circuit to the ATM switch for routing to a destination only if the received copy is the qualified copy.

17. The program of claim 16, wherein determining comprises receiving management traffic at the receive circuit indicating an alarm indication signal (AIS) or loss of continuity (LOC).

18. The program of claim 16, wherein determining comprises detecting a loss of a keep-alive signal.

19. The program of claim 16, wherein determining is based upon the following criteria:
   alarm indication signal (AIS),
   loss of continuity (LOC), or
   missing terminating circuit card; thereafter
   high bit error rate (BER).

20. The program of claim 16, wherein discarding comprises responding to qualifying information regarding the quality of virtual path (VP) copies to determine whether a VP copy received at the receive circuit is to be switched through or discarded.

21. The program of claim 16, wherein determining comprises communicating information related to qualifying to another receive circuit.

22. The program of claim 16, wherein the paths comprise a first path in a first direction around a SONET UPSR and a second path in a second direction around the SONET UPSR.

23. The program of claim 16, wherein the ATM switch is configured to route ATM traffic for a given virtual path (VP) from each of the paths to the destination.

24. A system for communicating data, comprising:
   a traffic source operable to communicate data as a plurality of copies via a plurality of paths,
   a plurality of receive circuits, the receive circuits operable to receive data from the traffic source on the plurality of paths and operable to qualify data on the paths based on information exchanged between two or more receive circuits to designate a particular receive circuit as active such that each other receive circuit discards its copy of the data; and
   the ATM switch configured to provide a route to a destination for each one of the paths, the ATM switch operable to route traffic from the active receive circuit to the destination.

25. The system of claim 24, wherein each receive circuit is operable to receive management traffic on a path indicating a degradation or loss in signal.

26. The system of claim 24, wherein each receive circuit is operable to detect a loss of a keep-alive signal of another receive circuit.

27. The system of claim 24, wherein the receive circuits communicate information related to traffic qualification.

28. The system of claim 24, wherein the ATM switch is configured to route ATM traffic for a given virtual path (VP) from each receive circuit to the destination.

29. The system of claim 24, wherein the receive circuits qualify signals based upon the following criteria:
- alarm indication signal (AIS),
- loss of continuity (LOC), or
- missing terminating circuit card; thereafter
- high bit error rate (BER).

30. The system of claim 24, wherein the paths comprise a first path in a first direction around a SONET UPSR and a second path in a second direction around the SONET UPSR.

31. A system for communicating data, comprising:
- means for receiving ATM traffic from a traffic source as a plurality of copies of traffic routed along a plurality of paths, each one of the paths having a receive circuit;
- means for configuring an ATM switch to provide a route to a common destination for each one of the paths;
- means for determining a qualified copy of the traffic based on information exchanged between two or more receive circuits; and
- means for discarding all copies of the traffic except for the qualified copy such that only the qualified copy is passed to the ATM switch for routing to the common destination.

32. A system for communicating data, comprising:
- an ATM switch; and
- a traffic reduction apparatus coupled to the ATM switch and coupled to a remote device through a plurality of paths, the apparatus operable to:
  - receive, at a plurality of receive circuits, ATM traffic from the remote device as a plurality of copies of traffic routed along the plurality of paths;
  - determine a qualified copy of the traffic based on information exchanged between two or more receive circuits;
  - discard all copies of the traffic except for the qualified copy; and
  - pass only the qualified copy to the ATM switch for routing.

* * * * *